A. H. MAÎTRE & V. H. G. MARTIN.
ELECTRICALLY OPERATED MUSICAL INSTRUMENT.
APPLICATION FILED MAR. 27, 1914.
1,295,548.
Patented Feb. 25, 1919.
4 SHEETS—SHEET 3.
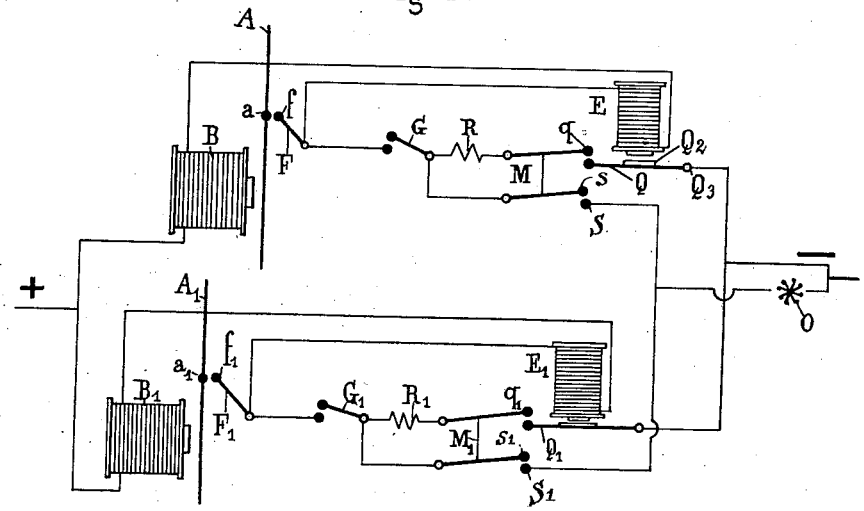
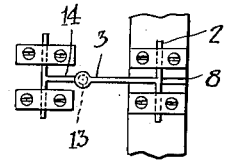
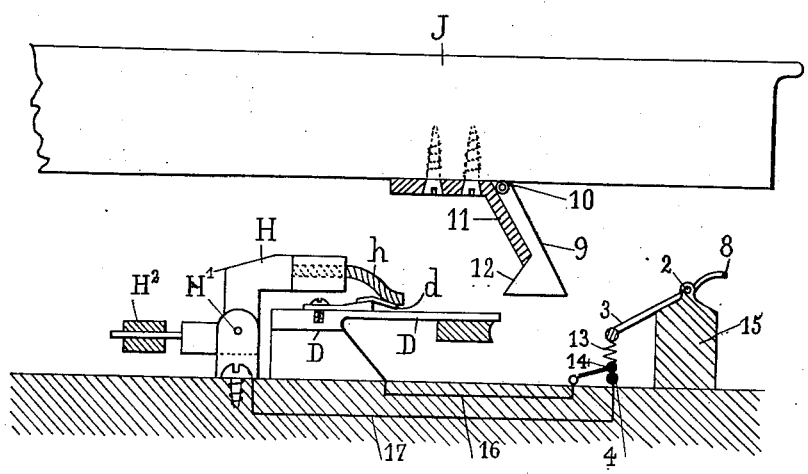
INVENTORS
ALCIDE HECTOR MAÎTRE
VICTOR HENRI GASTON MARTIN
BY *Henson and Henson* ATTORNEYS A. H. MAÎTRE & V. H. G. MARTIN.
ELECTRICALLY OPERATED MUSICAL INSTRUMENT.
APPLICATION FILED MAR. 27, 1914.

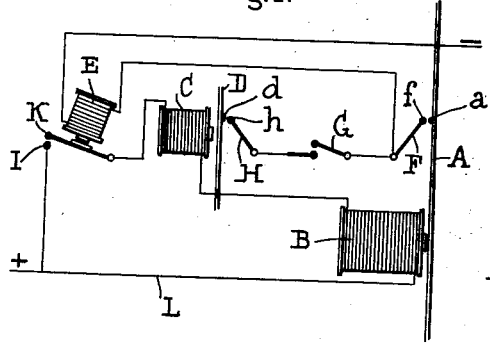
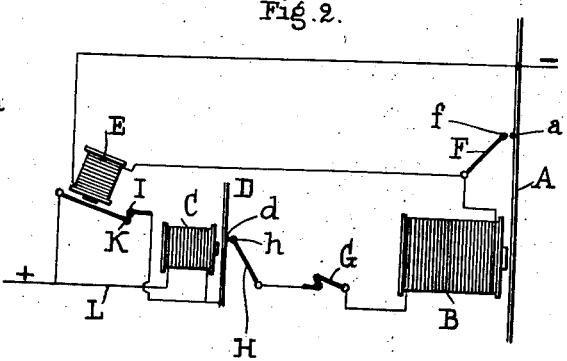
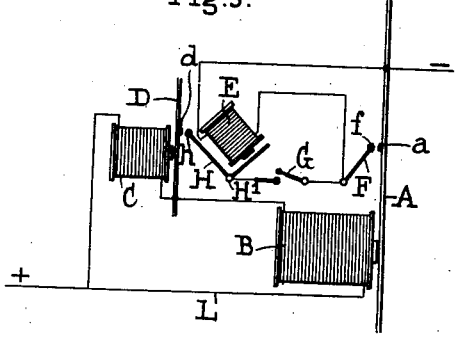
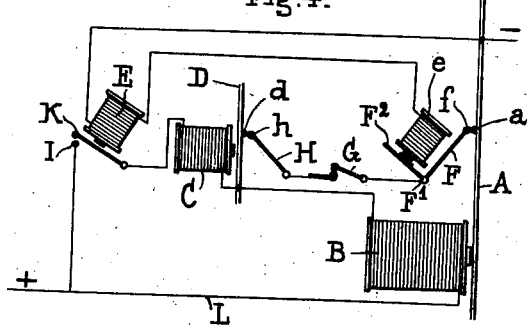
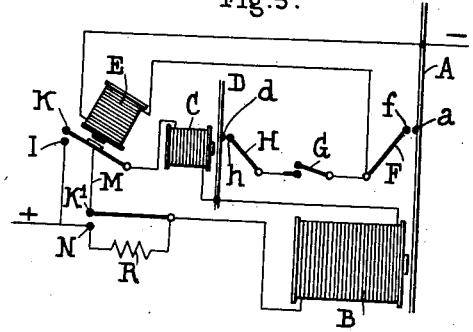
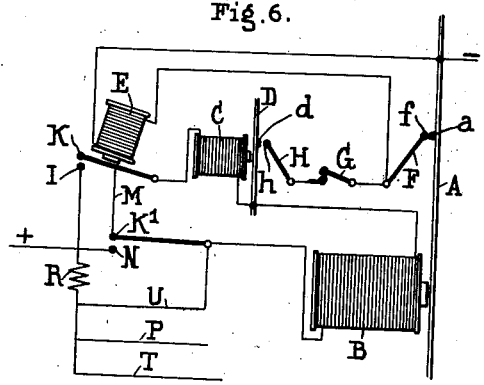

1,295,548.

Patented Feb. 25, 1919.
4 SHEETS—SHEET 4.

WITNESSES

INVENTORS
ALCIDE HECTOR MAÎTRE
VICTOR HENRI GASTON MARTIN
BY
their ATTORNEYS

UNITED STATES PATENT OFFICE.

ALCIDE HECTOR MAÎTRE AND VICTOR HENRI GASTON MARTIN, OF ROUEN, FRANCE.

ELECTRICALLY-OPERATED MUSICAL INSTRUMENT.

1,295,548.  Specification of Letters Patent.  Patented Feb. 25, 1919.

Application filed March 27, 1914. Serial No. 827,655.

*To all whom it may concern:*

Be it known that we, ALCIDE HECTOR MAÎTRE and VICTOR HENRI GASTON MARTIN, citizens of the Republic of France, and residents of 42 Rue Damiette, Rouen, France, have invented new and useful Electrically-Operated Musical Instruments, of which the following is a specification.

The present invention relates to improvements in electrically operated musical instruments of the type shown in our prior Patent No. 1,106,230.

The present invention consists in directing into the electromagnets which actuate the strings and, at the start of their vibration, a special interrupted current or auxiliary current for producing an initial quivering, and then substituting therefor the normal current which is to sustain the vibration of the string, whether the latter produces a tone which is loud, pianissimo, or tremolo. The auxiliary current employed is interrupted with a more or less rapid frequency.

The invention is characterized by the use of an auxiliary excitation for starting purposes, which is completely suppressed as soon as the amplitude of vibration of the vibrant member becomes sufficient for it to be self-exciting.

Hitherto for carrying out the auxiliary or starting excitation, there have been used contacts formed of two parts serving in turn, as contact-breaker device. One of the movable parts was set in vibration by an auxiliary excitation member (electromagnet, heating resistance, etc.,) in such a way as to interrupt the current and set the string quivering until it became self-exciting. The second part, connected to the string, became in turn the interrupter as soon as the amplitude of the movement of the string had become sufficient. But even after the string had become self-exciting, the auxiliary excitation did not completely disappear, and that which remained was sufficient to interfere with the sharpness of the break and to affect the working.

The present invention remedies this disadvantage by suppressing the auxiliary excitation after the starting in motion.

A first means for carrying out the invention consists in completely suppressing the movement of the movable contact piece as soon as the other part, connected to the string, vibrates with a sufficient amplitude. But in most cases it is advantageous to employ two distinct contacts; one for the auxiliary contact-breaker or auxiliary pulsator, the other for the string. In this way any desired amplitude can be given to the auxiliary contact-breaker device, without affecting the self-excitation of the string, since the auxiliary pulsator is completely stopped at the given time; this allows the use of powerful, rugged and reliable apparatus.

In the following apparatus, two contacts are employed, one at the string and the other at the auxiliary interrupter; but it is obvious that a single contact, viz., that at the string, may be used alone.

It may be remarked at this point that the interrupted current for effecting the initial excitation of the string may be of various frequencies according to the circuit arrangement adopted. For example, it may be:

(1) A single current operating several notes, a half keyboard or even the whole keyboard; in this case it may be interrupted in any manner whatever;

(2) A current specially interrupted for each note; in this case current is preferably synchronized with the vibration of the corresponding string.

Moreover the interrupted current for the excitation may be directed either into the main electromagnet operating the string, or into a special electromagnet and a special circuit for the quivering effect.

On the other hand the means for stopping the auxiliary excitation are numerous.

(1) There may be placed under each key a special contact for the interrupted current, this contact being made only when the key is pressed more strongly than usual upon reaching the bottom of its movement;

(2) In order not to affect the fingering, the interrupted current can be directed automatically for a given time, a suitably selected fraction of a second;

(3) The interrupted current can be delivered until the moment when the string becomes self-exciting and can be replaced at this exact moment by the normal current which is to sustain the vibration.

Moreover in any case the production and the cessation of the interruption may be effected mechanically or electrically. The present invention covers all possible combinations of these different means.

By way of example some typical combinations are mentioned below. In these examples, it will be supposed that only one electromagnet is used, both for the initial quivering of the string and for the sustaining of its vibration, because the use of a special electromagnet and a special circuit for the quivering evidently follow therefrom.

Figures 1, 2, 3, and 4 show the use of an auxiliary current for each note (this current being preferably synchronized with the vibration of the string) with automatic substitution of the normal current for the auxiliary current as soon as the string becomes self-exciting.

Fig. 4 represents moreover a device for allowing a very light pressure upon the string during the passage of the auxiliary current and a greater contact pressure when the string becomes self-exciting.

Figs. 5 and 6 represent a device for automatically directing the whole of the interrupted current into the electromagnet of the string, in such a manner as to produce a maximum auxiliary excitation at the initiation of all the notes, even when the latter are played pianissimo, and introducing into the circuit a resistance as soon as the string has become self-exciting, in order to produce the pianissimo effect. The resistance is placed in the branch circuit of the note in Fig. 5 and in the common portion of the circuit in Fig. 6.

Figs. 7 and 8 show the use of a single auxiliary pulsator for the quivering of several notes, with automatic substitution of the normal current for the interrupted current as soon as the string becomes self-exciting.

Fig. 7 represents diagrammatically an individual circuit arrangement for a single note;

Fig. 8 is a similar diagram showing a circuit arrangement common to a group of two notes;

Fig. 12 represents a vibrator actuated by the key and producing mechanically an auxiliary synchronous excitation of short duration.

Fig. 13 is a plan of portion of Fig. 12.

Figure 7:
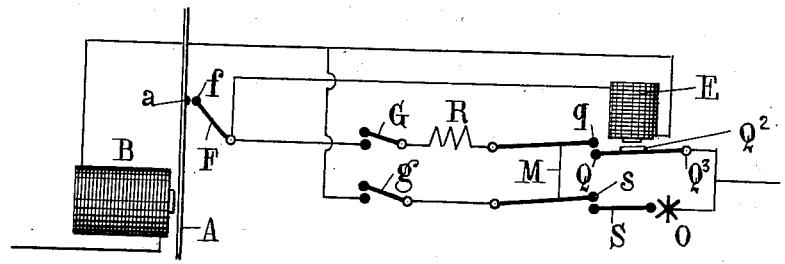

*Example I—Use of a special current (preferably synchronized) for each note and automatic substitution of the normal current for the special current as soon as the string becomes self-exciting.* (Figs. 1 to 6.)

The principle consists in employing the vibration of the string for stopping the auxiliary excitation; any electrical, mechanical, electro-mechanical or other means may be used.

By way of example an electrical method is hereafter indicated. Its principle consists in utilizing the first breaks produced by the string; for this purpose there is arranged a branch circuit in parallel to the individual contact of this string. During the successive breaks of this contact, a current passes through the branch circuit and actuates the change-over devices.

All the effects of this current can be employed to effect the change-over, viz: rise of temperature, electromagnetic force, etc. Electromagnets being of particularly wide application, the invention will be described on the supposition that they are used.

Figs. 1, 2, and 3 represent diagrammatically by way of example automatic change-over devices upon this principle.

By way of example, the auxiliary pulsator is a trembler, but any other device might be used for it.

A is the string actuated by the electromagnet B; D is an auxiliary vibrating body tuned in unison with the string A and actuated by the electromagnet C.

E is the electromagnet placed in parallel to the individual contact $f\,a$ of the string A and intended to suppress the auxiliary excitation. F is the movable part of the contact $f\,a$ of the string. This contact is closed when all the parts are at rest. H is that of the contact $d\,h$ of the auxiliary vibrating pulsator; G is the contact placed under the key of the keyboard.

In Fig. 1, when the key is raised, the contact G is broken so that no current passes; the contact I is closed as well as $f\,a$ and $d\,h$.

When the key is depressed, the circuit is closed at G; the current passes at I K to the electromagnet C and vibrates the auxiliary member D. The breaks which are then produced between the contact pieces $d\,h$ of the auxiliary pulsator serve to interrupt the current coming from the source by the lead L; this current then passes to the electromagnet B, continuing by D, d, h, H, G. F. f, a, A, and so reaching the source.

The electromagnet B thus excited sets the string quivering sufficiently strongly to produce breaks at f a if the movable piece F is suitably regulated.

As soon as the breaks take place at f, a, a shunt current passes to the electromagnet E which attracts the movable part K and breaks the contact at I K; from this time onward current no longer circulates to the electromagnet C. The auxiliary vibrating member stops, the current coming from the source along L and B is no longer interrupted at d h; it follows the path H, G, F, is interrupted at f a and then returns to the source. At this moment this string has become self-exciting.

In Fig. 2 the electromagnet E stops the electromagnet C by short-circuiting it.

The contact I K being broken, when a key is pressed the current follows L, C, D, d, h, H, G, B, F, f, a, and returns to the source.

The vibrator D begins to move and vibrates the string by means of the electromagnet B; breaks occur at f, a and the electromagnet E then enters into action, attracts K, establishes the contact I K and short circuits the electromagnet C; the breaks then cease at d h and the string A becomes self-exciting.

Fig. 3 represents a device in which the electromagnet E locks the contact d, h, by pressing h upon d when the string A has become self-exciting.

In Figs. 1 to 3 the vibration of the string produces ruptures of the current at f, a, because the movable contact F is relatively stationary through its inertia and bears lightly against the string. It is possible to facilitate the production of these ruptures by removing the pressure of the contact for a very short time, for example, by submitting the lever F to the attraction of an electromagnet connected in the circuit of B and tending to separate the contacts when they are engaged in repose, or on the contrary, as shown at e Fig. 4, tending to bring the contacts into engagement, when in repose they are separated. In the latter case, as soon as the electromagnet e, closes the contact f, a, it is short circuited and releases the armature $F^2$ with the result that the contact f a is broken and the pressure of the contacts at this moment is rendered very feeble.

In both cases when the key is depressed and up to the moment when the string becomes self-exciting, the movable contact vibrates rapidly, and if all is well regulated, that is to say, if the vibration of F is well deadened, (as for example by a brake device such as shown in our Patent 1,188,295), the oscillations of the movable contact are so small that they are invisible, the contact is so lightly closed as to be practically open and the pressure of f on a is practically null.

When the string has become self-exciting, the pulsations of current are in synchronism with the vibrations of the string and no longer synchronous with the vibration of the contact arm F; consequently the oscillations of the latter are poorly maintained and diminish in amplitude and the string remains self-exciting.

Fig. 4 shows an arrangement in which the pressure of the contacts, which is null at repose, is increased during the vibration of the string by an electromagnet e mounted across the point of rupture.

The letters and the arrangement are the same as in Fig. 1, but the contact lever F pivoting around the axis F' carries an iron armature $F^2$ subject to the attraction of the electromagnet e connected like the electromagnet E in parallel to the contact f a; e and E are supposed to be connected in series.

Everything is adjusted so that in the absence of current, the contact f a has a light grazing pressure; when by the pressure of a key, the circuit is closed at G, the vibrator D becomes active; the pulsations of current produced at d, h, excite the principal electromagnet B, which, in turn, vibrates the string A. The pressure being null between f and a, the least quivering of the string A produces breaks at f a. As soon as the first breaks take place at f, a, a derived or shunt current passes to the electromagnet e which attracts the armature F and exerts a suitable pressure of f upon a. By this arrangement, the light contact at starting and suitable contact pressure during operation are insured; these conditions are indispensable for good starting and for the development of an intense and regular sound.

The light contact at f a is assured because when the contacts are not in engagement at this point on the depression of the key, the current flowing through e reëstablishes the contact at once.

The diagrams Figs. 5 and 6 indicate how it is possible by the use of the arrangements described, to cut out the resistance of the circuit during the initial vibration of the string and to introduce the resistance into the circuit as soon as the string has become self-exciting so as to produce the pianissimo effect.

In Fig. 5 there is a resistance in the circuit of each note; in Fig. 6 this resistance is in the common portion of the circuit.

The parts corresponding to those of Fig. 1 are designated by the same references in Fig. 5. In addition, M is a non-conducting connection between the contact levers K and $K^1$. The contact $K^1$ presses upon the contact piece N which is in connection with the source of current. R is a resistance connected in parallel to the contact N K$^1$. At the beginning of the excitation the parts N and K$^1$ are in contact; all the interrupted current passes to B.

At the moment the string becomes self-exciting, the electromagnet E raises K and by means of M raises also K$^1$. The contact N K$^1$ is thus broken, as likewise I K, and the resistance R is inserted in the circuit. Thus, during the period of excitation all the interrupted current passes into B, whereas during playing, all suitable resistance is inserted in the circuit of B.

Fig. 6 is a detail modification of Fig. 5. P, T, U are wires which each lead to an electromagnet such as B placed in front of a string; R is then placed in the common portion of the circuit instead of being inserted in the special circuit of B as in Fig. 5.

*Example II—Use of a single auxiliary pulsator to vibrate several strings, and automatic substitution of the normal current for the vibrating current as soon as the string becomes self-exciting.*

Fig. 7 represents diagrammatically the circuit for one note. Fig. 8 is a diagram similar to that of Fig. 7, showing an arrangement of the circuit common to a group of two notes. For the sake of simplicity, the illustration of the electromagnet, which operates the movable contact F, is not shown.

B and B$^1$ are the main electromagnets which actuate the string; $a, f$ and $a', f'$, the contact pieces of the string; G, G', $g$, the contacts placed under the key; R, R' the resistances placed in the circuit, Q, $q$, Q', $q'$, S', $s'$, S, $s$, the contacts which effect the change-over of the currents. O is the auxiliary pulsator device common to a group of notes. Q$^2$ is an iron armature carried by a spring or a movable arm Q mounted on a pivot Q$^3$; the contact pieces $q$, S are also mounted on pivots or springs. M is a non-conductive tie, preferably a thread.

The operation is as follows:

Contact being established at S $s$ and broken between Q $q$, the interrupted current passes only to the electromagnet B which sets the string quivering. As soon as the latter is sufficiently in motion, the contact $a, f$, is broken, a branch circuit actuates E, which, lifting Q$^2$, establishes the contact Q $q$ and breaks the contact S, $s$. From this time onward, the normal current only passes to the electromagnet B and continues to actuate the string which has become self-exciting.

To avoid a complete stoppage of current during working, it is advisable to put Q and $q$ in contact at the same time as contact is broken at S $s$. A slight advance or retard of one upon the other is of no harm; adjustment is easy.

In this device the interrupted current and the normal current are in existence together for a very short time. It would be easy to construct the opposite arrangement, in which S $s$ would be broken for a very short time before the contact was made at Q $q$.

*Example III—Change-over of the currents by pressing upon the key more heavily than usual.*

Figure 10:
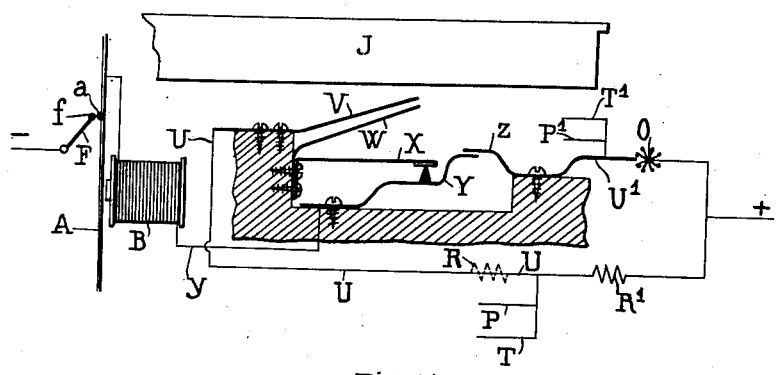
Fig. 10 shows a device for suppressing the auxiliary excitation by means of a greater pressure upon the key already lowered.

Fig. 10 represents a device in which the auxiliary excitation is obtained by exerting an especially heavy pressure upon the key already depressed. J is the key of the keyboard, B the electromagnet operating the string, O the member interrupting the current, R, R', a rheostat; the latter is arranged either at R, if one desires a rheostat for each note, or at R', if it is sufficient to have a single rheostat for the general circuit. U and U' are conductors in the circuit of the note corresponding to the electromagnet B; P P', T T' are the leads for the circuits of the other notes; V, W are two elastic contact pieces, W being in electrical connection with X which is a fixed contact piece; Y and Z are elastic contact pieces.

When the key J is raised, X and Y are in contact but no current passes because the contacts V W and Z Y are broken. When the key is pressed in the ordinary way, it places V W in contact without closing Y Z because Z is a stiff spring; the normal current is directed to the electromagnet B, along R' (or R), U, V, W, X, Y, $y$, the electromagnet B, the contact $a f$ and so back to the source.

When the key J is pressed more firmly than usual, the stiff spring Z is flexed and closes the contacts Y Z and almost at once breaks the engagement between contacts Y X. In this way the interrupted current is passed only to the electromagnet B, along O, U', Z, Y, $y$, B, $a, f$ F to the source. Once the quivering of the string is produced, a weaker pressure upon the key reëstablishes the normal playing current because the contact Y Z is broken and the contact X Y reclosed.

*Example IV—Passage of the interrupted current for a given time.*

Figure 11:
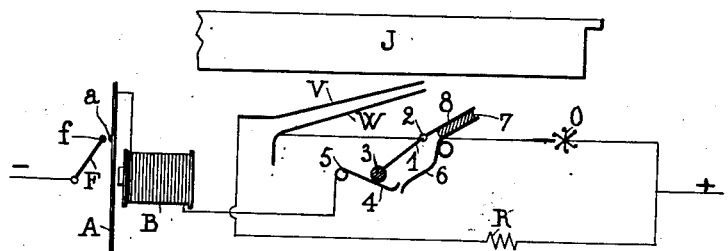
Fig. 11 represents a device for suppressing the auxiliary excitation at the end of a given time by means of a small balance acting by its inertia.

Fig. 11 illustrates an arrangement in which the duration of the current varies slightly according to the rapidity with which the key is depressed. It comprises essentially a rocking contact the amplitude, and consequently the duration of oscillation of which varies in accordance with the impulse communicated thereto by the key and regulates thus the flow of the interrupted current. A small balance lever 1, oscillating around the axis 2 is weighted at its end 3 which rests upon an incline 4, all of these parts being electric conductors. The incline 4 is carried by a flexible spring 5 which is electrically connected with the electromagnet B.

A second spring 6, fixed to the balance by means of an insulator 7, is in electrical engagement with a pulsator O, for example, a rotary pulsator comprising radial contact studs or pieces and interposed insulation arranged in the circuit from any suitable source and serving to interrupt the current.

V and W are two elastic contacts placed under the key J. V is in connection through R with the source of the normal current.

When the key is raised no current passes. When it is pressed, V and W are closed, the normal current passes to R, along V, W, 2, 1, 3, which presses upon 4, 4, 5 the electromagnet B, the string and the source.

When the key arrives at the end of its stroke it presses at 8 upon the balance 1 of which the weight 3 is raised without breaking its contact with the part 4; 5 being elastic, the normal current still continues to pass.

But if the key has been depressed with sufficient speed, the balance-weight 3 continues its movement by virtue of its inertia, and the contact pieces 3, 4 separate while 4 and 6 come into contact.

The break at 3, 4 stops the normal current; the close of the contacts 4, 6 places the interrupted current in circuit.

Once the balance-weight 3 has reached the end of its upward stroke, it drops again upon the inclined surface 4 which cushions its fall; the normal current is reëstablished and the interrupted current stops.

It is thus possible by a more or less lively pressure of the finger to obtain the passage of the interrupted current for a longer or short time.

It is evident that in this device the pulsator device O can be a vibrator tuned in unison with the string A, and set in vibration mechanically by any suitable part of the mechanism of the piano, preferably by the key if the piano is played by hand, and by a special device if the instrument is pneumatic or automatic.

Fig. 12 represents a light hook 9 pivoted at 10 beneath the key J, and pressing, when at rest, upon a felt-covered support 11.

When the key J is depressed, the hook 9 vibrates the rod D; but when the key returns upward, the inclined plane 12 throws back the hook and the rod is not excited. The movable arm H, pivoted at H¹, carries a small adjustable weight H² by which the pressure between $d$ and $h$ may be regulated in such manner that the vibration of the auxiliary interrupter D produces successive interruptions of the current between $d$ and $h$.

An oscillating lever 3, pivoted at 2 on an insulated support 15, permits, by reason of the length of the wire 13, the pivoted arm 14 to rest upon the contact 4 and thus short-circuits $d$, $h$, through the wires 16 and 17.

The balance 3 functions in the same manner as has been previously described with relation to Fig. 11. When the key is depressed gently, the wire 13 is drawn out by the lever 3 but does not lift the pivoted arm 14, but when the key is depressed rapidly, the balance continues its course by reason of its own inertia and breaks the engagement between 14 and 4; the balance then falls upon its support 15 and the pivoted lever 14 returns in contact with 4, so that the current is interrupted by D only for a very short time.

Figure 9:
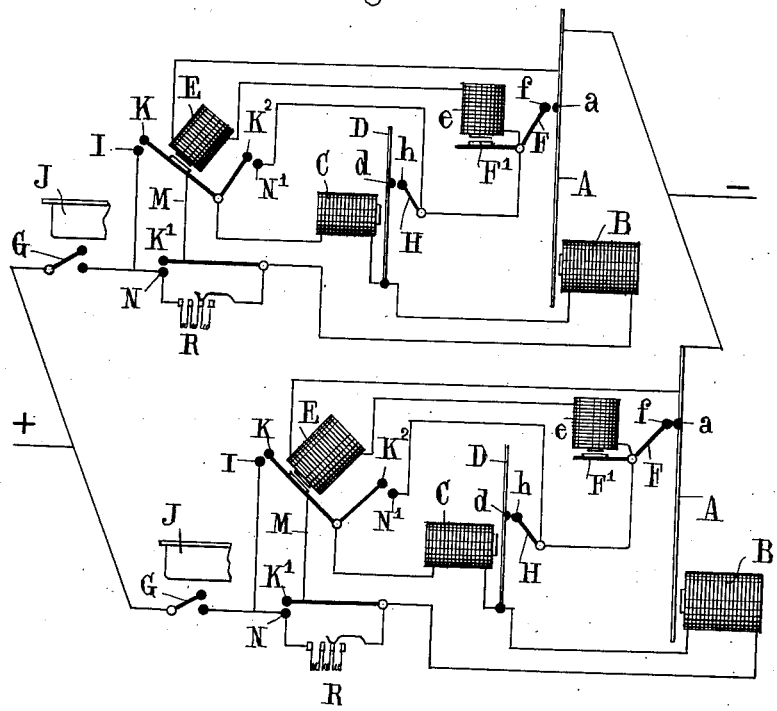
Fig. 9 is a diagram of an organization showing a circuit arrangement for two notes, indicating means to produce the initial maximum vibration and means to halt the auxiliary excitation by short circuiting the contacts of the auxiliary pulsator.

An analogous short circuit arranged on $d$, $h$, could also arrest the auxiliary interrupter D in Figs. 1 to 6 in the manner shown in Fig. 9.

Fig. 9 illustrates an application of this means to strings and embodies a résumé of the essential points of the invention. The two electromagnets $e$, E are arranged in a circuit across the contact points $a$, $f$, as has been said above in connection with the description, Fig. 4. The magnet E serves to close the contacts $K^2$, $N^1$, and to short circuit that portion of the circuit outlined by the references $K^2$, C, D, $d$, $h$, H, as soon as the string becomes self-exciting. The contact pieces $K^2$, K are carried by a rocking lever of conducting material, which, as soon as the string becomes self-exciting, tilts into engagement with the contact $N^1$, and simultaneously lifts the lever carrying the contact $K^1$ through the insulating tie M and introduces the rheostat R into the circuit.

The essential functions are as follows:—

When the key J is in its normal "up" position, K and I are in contact and also $K^1$ and N; $K^2$ and $N^1$ are separated, while $d$ and $h$ are in contact and $a$ and $f$ touch each other. When the key J is depressed, the circuit is closed at G and the current bifurcates following two paths to the pulsator D. The one follows the path I, K, and the lever carrying the latter, the electromagnet C to the bottom of the vibrator D; the other follows the course N, $K^1$ and its lever, electromagnet B and thence to vibrator D. From the latter the entire current follows the same course, viz: through $d$, $h$, H, F, $f$, $a$, A, to its source. As soon as the circuit has been closed, the auxiliary interrupter or pulsator D starts vibrating, thereby rendering the current pulsating and the string is set in motion by the electro-magnet B. As soon as the string is set in motion, ruptures are produced in the circuit between the contacts $a$, $f$, which increases the excitation and at the same time switches the current into the electro-magnets $e$, E. The electromagnet $e$ augments the pressure between the contacts $a$, $f$, while the electromagnet E rocks the lever K, $K^2$ into engagement with the contact N¹. As a result of this movement of the lever K, K², the circuit is broken between the contacts I, K, and also between contacts N, K¹; the contacts K², N¹ are brought into engagement and the current follows the course G, N, R, B, D, d, h, F, f, a, A, and returns to its source. The string has become self-exciting, the rheostat R has been brought into the circuit, the pulsator D has been short circuited, the pressure between the contacts f a has been increased. As soon as the key is released, the contact is broken at G, and the various parts return immediately to their original position of repose.

What we claim and desire to secure by Letters Patent of the United States is:

1. In a musical instrument, a key, a contact device operated by said key, a sounding body, an electromagnet for vibrating said sounding body, a contact actuated by said sounding body, a coöperating contact, a pulsator, a circuit embracing said contact device, electromagnet and coöperating contacts, and means for exciting said electromagnet at the moment of initial vibration of the sounding body, by supplying to said electro-magnet an auxiliary interrupted current.

2. In a musical instrument, a key, a contact device operated by said key, a sounding body, an electromagnet for vibrating said sounding body, a contact actuated by said sounding body, a coöperating contact, a pulsator, a circuit embracing said contact device, electromagnet and coöperating contacts, and means for exciting said electromagnet at the moment of initial vibration of the sounding body, by supplying to said electro-magnet an auxiliary interrupted current synchronized with the sounding body.

3. In a musical instrument, a key, a contact device operated by said key, a sounding body, an electromagnet for vibrating said sounding body, a contact actuated by said sounding body, a coöperating contact, a pulsator, a circuit embracing said contact device, electromagnet and coöperating contacts, and means for exciting said electromagnet at the moment of initial vibration of the sounding body, by supplying to said electro-magnet an auxiliary interrupted current, together with means to suppress said auxiliary excitation as soon as the sounding body is sufficiently vibrated to become self-exciting.

4. In a musical instrument, a key, a contact device operated by said key, a sounding body, an electromagnet for vibrating said sounding body, a contact actuated by said sounding body, a coöperating contact, a pulsator, a circuit embracing said contact device, electromagnet and coöperating contacts, and means for exciting said electromagnet at the moment of initial vibration of the sounding body, by supplying to said electro-magnet an auxiliary interrupted current, together with means to suppress said auxiliary excitation and to establish the normal current alone in said electromagnet as soon as the sounding body is sufficiently vibrated to become self-exciting.

5. In a musical instrument, a key, a contact device operated by said key, a sounding body, an electromagnet for vibrating said sounding body, a contact actuated by said sounding body, a movable arm carrying a coöperating contact, a pulsator, a circuit embracing said contact device, electromagnet and coöperating contacts, and means for exciting said electromagnet at the moment of initial vibration of the sounding body, by supplying to said electro-magnet an auxiliary interrupted current, together with means to suppress said auxiliary excitation and to establish the normal current alone in said electromagnet as soon as the sounding body is sufficiently vibrated to become self-exciting.

6. In a musical instrument, a key, a contact device operated by said key, a sounding body, an electromagnet for vibrating said sounding body, a contact actuated by said sounding body, a coöperating contact, a circuit embracing said contact device, electromagnet and coöperating contacts, an auxiliary pulsator arranged in said circuit, a pair of contacts associated with said pulsator to produce, at the moment of initial vibration of the sounding body, successive pulsations of current in the said electromagnet, means to actuate said pulsator and means for suppressing the auxiliary excitation caused thereby, as soon as the sounding body is sufficiently vibrated to become self-exciting.

7. In a musical instrument, a key, a contact device operated by said key, a sounding body, an electromagnet for vibrating said sounding body, a contact actuated by said sounding body, a coöperating contact, a circuit embracing said contact device, electromagnet and coöperating contacts, an auxiliary pulsator arranged in said circuit, and tuned to the sounding body, a pair of contacts associated with said pulsator to produce, at the moment of initial vibration of the sounding body, successive pulsations of current in the said electromagnet, means to actuate said pulsator and means for suppressing the auxiliary excitation caused thereby, as soon as the sounding body is sufficiently vibrated to become self-exciting.

8. In a musical instrument, a key, a contact device operated by said key, a sounding body, an electromagnet for vibrating said sounding body, a contact actuated by said sounding body, a coöperating contact, a circuit embracing said contact device, electromagnet and coöperating contacts, an auxiliary vibratory pulsator arranged in said circuit and vibrating in unison with said sounding body, a pair of contacts associated with said pulsator to produce, at the moment of initial vibration of the sounding body, successive pulsations of current in the said electromagnet, means to actuate said pulsator and means for suppressing the auxiliary excitation caused thereby, as soon as the sounding body is sufficiently vibrated to become self-exciting.

9. In a musical instrument, a key, a contact device operated by said key, a sounding body, an electromagnet for vibrating said sounding body, a contact actuated by said sounding body, a coöperating contact, a circuit embracing said contact device, electromagnet and coöperating contacts, an auxiliary pulsator arranged in said circuit, a pair of contacts associated with said pulsator to produce, at the moment of initial vibration of the sounding body, successive pulsations of current in the said electromagnet, electrically controlled means to actuate said pulsator and means for suppressing the auxiliary excitation caused thereby, as soon as the sounding body is sufficiently vibrated to become self-exciting.

10. In a musical instrument, a key, a contact device operated by said key, a sounding body, an electromagnet for vibrating said sounding body, a contact actuated by said sounding body, a coöperating contact, a circuit embracing said contact device, electromagnet and coöperating contacts, an auxiliary pulsator arranged in said circuit, a pair of contacts associated with said pulsator to produce, at the moment of initial vibration of the sounding body, successive pulsations of current in the said electromagent, electromagnetic means to actuate said pulsator and means for suppressing the auxiliary excitation caused thereby, as soon as the sounding body is sufficiently vibrated to become self-exciting.

11. In a musical instrument, a key, a contact device operated by the key, a sounding body, a principal electromagnet for vibrating the sounding body, a contact moving with the latter, a pivoted contact coöperating therewith, an operating circuit embracing said contacts, electromagnet and contact device, a pulsator tuned to the vibrations of the sounding body, an auxiliary electromagnet for vibrating said pulsator, a pair of contacts serving to produce, at the moment of initial vibration in the sounding body, both the self-excitation of the pulsator and pulsations of current in the principal electromagnet, together with means to suppress the auxiliary excitation of the latter and to establish therein the normal exciting current as soon as the sounding body is sufficiently in motion to become self-exciting, said pulsator and associated parts being suitably connected in said operating circuit.

12. In a musical instrument, a key, a contact device operated by the key, a sounding body, a principal electromagnet for vibrating the sounding body, a contact moving with the latter, a pivoted contact coöperating therewith, an operating circuit embracing said contacts, electromagnet and contact device, a pulsator tuned to the vibrations of the sounding body, an auxiliary electromagnet arranged in parallel with the principal electromagnet and serving to vibrate said pulsator, a pair of contacts serving to produce, at the moment of initial vibration in the sounding body both the self-excitation of the pulsator and pulsations of current in the principal electromagnet, together with means to suppress this auxiliary excitation of the latter and to establish therein the normal exciting current as soon as the sounding body is sufficiently in motion to become self-exciting.

13. In a musical instrument, a key, a contact device operated thereby, a sounding body, an electromagnet for vibrating the latter, a contact moving with the sounding body, a movable contact coöperating therewith and normally engaging the same, a pulsator, an operating circuit embracing said electromagnet, contact device and coöperating contacts, together with means for exciting said electromagnet, at the moment of initial vibration of the sounding body, by supplying to said electro-magnet an auxiliary interrupted current, and means for automatically suppressing said auxiliary excitation and reëstablishing the normal excitation of said electromagnet as soon as the sounding body is sufficiently active to become self-exciting.

14. In a musical instrument, a key, a contact device operated thereby, a sounding body, an electromagnet for vibrating the latter, a contact moving with the sounding body, a movable contact coöperating therewith and normally engaging the same, a pulsator, an operating circuit embracing said electromagnet, contact device and coöperating contacts, together with means for exciting said electromagnet, at the moment of initial vibration of the sounding body, by supplying to said electro-magnet an auxiliary interrupted current, and means controlled by said sounding body for automatically suppressing said auxiliary excitation and reëstablishing the normal excitation of said electromagnet as soon as the sounding body is sufficiently active to become self-exciting.

15. In a musical instrument, a key, a contact device operated, thereby, a sounding body, an electromagnet for vibrating the latter, a contact moving with the sounding body, a movable contact coöperating therewith and normally engaging the same, a pulsator, an operating circuit embracing said electromagnet, contact device and coöperating contacts, together with means for exciting said electromagnet, at the moment of initial vibration of the sounding body, by supplying to said electromagent an auxiliary interrupted current, an auxiliary circuit arranged in parallel to the operating circuit and embracing said contact moving with the sounding body and its coöperating contact and means in said auxiliary circuit for automatically suppressing the auxiliary excitation of the operating electromagnet and reëstablishing the normal excitation thereof as soon as the sounding body is sufficiently active to become self-exciting.

16. In a musical instrument, a key, a contact device operated thereby, a sounding body, an electromagnet for vibrating the latter, a contact moving with the sounding body, a movable contact coöperating therewith and normally engaging the same, a pulsator, an operating circuit embracing said electromagnet, contact device and coöperating contacts, together with means for exciting said electromagnet, at the moment of initial vibration of the sounding body, by supplying to said electro-magnet an auxiliary interrupted current, an auxiliary circuit arranged in parallel to the operating circuit and embracing said contact moving with the sounding body and its coöperating contact and electromagnetic means in said auxiliary circuit for automatically suppressing the auxiliary excitation of the operating electromagnet and reëstablishing the normal excitation thereof as soon as the sounding body is sufficiently active to become self-exciting.

17. In a musical instrument, a key, a contact device operated thereby, a sounding body, an electromagnet for vibrating the latter, a contact moving with the sounding body, a movable contact coöperating therewith and normally engaging the same, a pulsator, an operating circuit embracing said electromagnet, contact device and coöperating contacts, together with means for exciting said electromagnet, at the moment of initial vibration of the sounding body, by supplying to said electro-magnet an auxiliary interrupted current, a pair of relatively movable contacts in the circuit of the interrupted current, and electromagnetic means, controlled by the contact moving with the sounding body, for separating said relatively movable contacts in the auxiliary interrupted circuit as soon as the sounding body is sufficiently active to become self-exciting.

18. In a musical instrument, a key, a contact device operated by said key, a sounding body, an electromagnet for vibrating the latter, a pair of normally closed contacts one of which moves with the sounding body, a rheostat, an operating circuit embracing said contact device, electromagnet, closed contacts and rheostat, means for exciting the electromagnet with an interrupted current during the initial vibration of the sounding body, means to short circuit the rheostat during this initial excitation of the electromagnet and means to reëstablish the circuit through the rheostat and the initial excitation of the electromagnet by the interrupted current as soon as the sounding body is sufficiently active to become self-exciting.

19. In a musical instrument, a key, a contact device operated by said key, a sounding body, an electromagnet for vibrating the latter, a pair of normally closed contacts one of which moves with the sounding body, a rheostat, an operating circuit embracing said contact device, electromagnet, closed contacts and rheostat, means for exciting the electromagnet with an interrupted current during the initial vibration of the sounding body, means to short-circuit the rheostat during this initial excitation of the electromagnet and electromagnetic means to reëstablish the circuit through the rheostat and the initial excitation of the electromagnet by the interrupted current as soon as the sounding body is sufficiently active to become self-exciting.

20. In a musical instrument, a key, a contact device operated by said key, a sounding body, an electromagnet for vibrating the latter, a pair of normally closed contacts one of which moves with the sounding body, an operating circuit embracing said contact device, electromagnet, and a pair of normally closed contacts, an auxiliary pulsator, a pair of contacts controlled by the latter and serving to interrupt the exciting current of the electromagnet during the initial vibration of the sounding body, a rheostat in the operating circuit, means to short circuit the rheostat during said initial excitation and means for reinstating the rheostat in the circuit simultaneously with the suppression of the auxiliary pulsator as soon as the sounding body becomes self-exciting.

21. In a musical instrument, a key, a contact device operated by said key, a sounding body, an electromagnet for vibrating said sounding body, a contact actuated by said sounding body, a coöperating contact, a pulsator, a circuit embracing said contact device, electromagnet and coöperating contacts, and means for exciting said electromagnet at the moment of initial vibration of the sounding body, by supplying to said electro-magnet an auxiliary interrupted current, together with means to suppress said auxiliary excitation as soon as the sounding body is sufficiently vibrated to become self-exciting, and means to thereupon augment the pressure between the contact actuated by the sounding body and its coöperating contact.

22. In a musical instrument, a key, a contact device operated by said key, a sounding body, an electromagnet for vibrating said sounding body, a contact actuated by said sounding body, a coöperating contact, a pulsator, a circuit embracing said contact device, electromagnet and coöperating contacts, and means for exciting said electromagnet at the moment of initial vibration of the sounding body, by supplying to said electromagnet an auxiliary interrupted current, together with means to suppress said auxiliary excitation as soon as the sounding body is sufficiently vibrated to become self-exciting, and means controlled by said sounding body to thereupon augment the pressure between the contact actuated by the sounding body and its coöperating contact.

23. In a musical instrument, a key, a contact device operated by said key, a sounding body, an electromagnet for vibrating said sounding body, a contact actuated by said sounding body, a coöperating contact, a pulsator, a circuit embracing said contact device, electromagnet and coöperating contacts, and means for exciting said electromagnet at the moment of initial vibration of the sounding body, by supplying to said electro-magnet an auxiliary interrupted current, together with means to suppress said auxiliary excitation as soon as the sounding body is sufficiently vibrated to become self-exciting, and means arranged in a branch circuit controlled by said sounding body to thereupon augment the pressure between the contact actuated by the sounding body and its coöperating contact.

24. In a musical instrument, a key, a contact device operated by said key, a sounding body, an electromagnet for vibrating said sounding body, a contact actuated by said sounding body, a coöperating contact, a pulsator, a circuit embracing said contact device, electromagnet and coöperating contacts, and means for exciting said electromagnet at the moment of initial vibration of the sounding body, by supplying to said electromagnet an auxiliary interrupted current, together with means to suppress said auxiliary excitation as soon as the sounding body is sufficiently vibrated to become self-exciting, and electromagnetically controlled means to thereupon augment the pressure between the contact actuated by the sounding body and its coöperating contact.

In testimony whereof we sign our names to this specification in the presence of two subscribing witnesses.

ALCIDE HECTOR MAÎTRE.
VICTOR HENRI GASTON MARTIN.

Witnesses:
 LOUIS COROUGE,
 LUCIUS MEMMINGER.